No. 865,307. PATENTED SEPT. 3, 1907.
E. A. JOHNSTON.
SEED DROPPING MECHANISM FOR CORN PLANTERS.
APPLICATION FILED APR. 25, 1907.
2 SHEETS—SHEET 2.
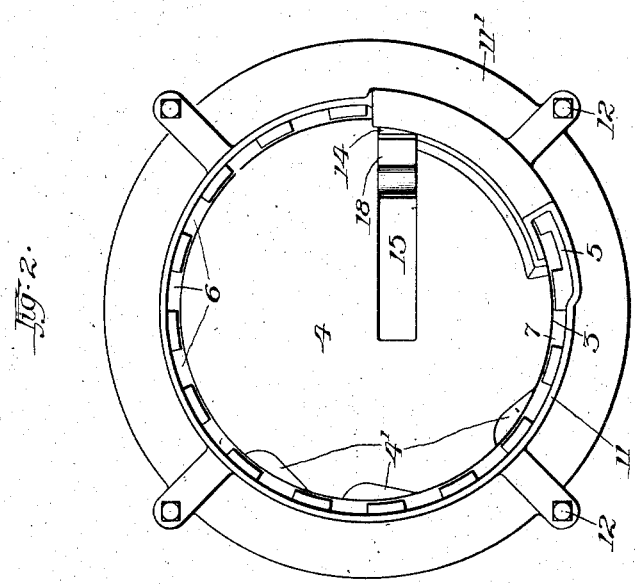
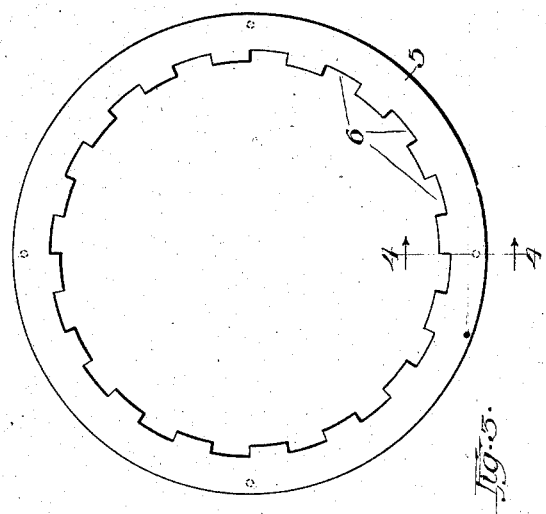
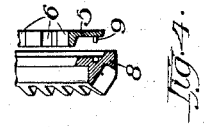
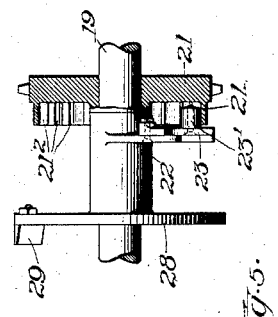
Witnesses:
J. M. Daggett.
F. W. Hoffmeister.
Inventor:
Edward A. Johnston.
By J. C. Warnes,
Attorney.

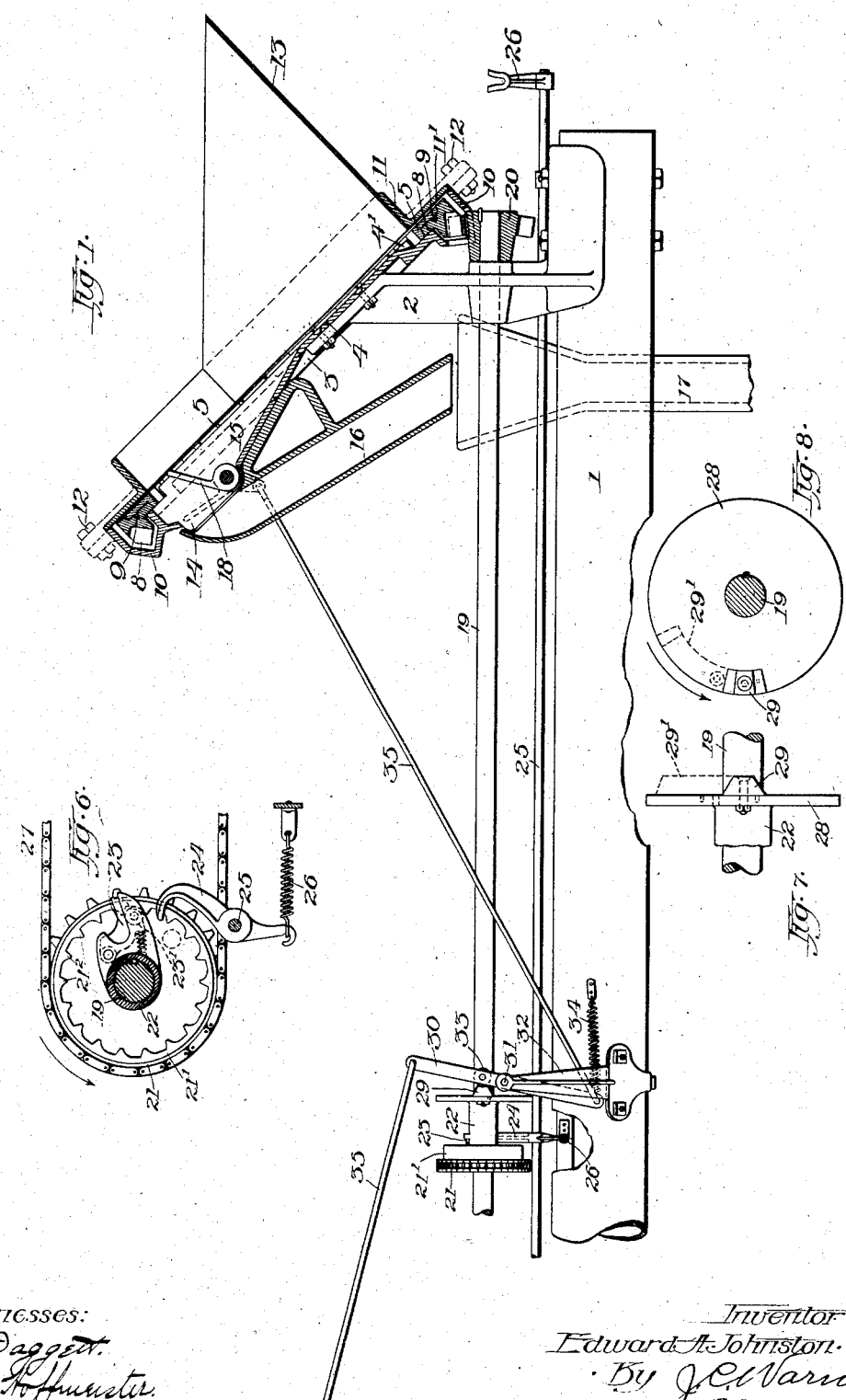

UNITED STATES PATENT OFFICE.

EDWARD A. JOHNSTON, OF STERLING, ILLINOIS, ASSIGNOR TO INTERNATIONAL HARVESTER COMPANY, A CORPORATION OF NEW JERSEY.

SEED-DROPPING MECHANISM FOR CORN-PLANTERS.

No. 865,307.      Specification of Letters Patent.      Patented Sept. 3, 1907.

Application filed April 25, 1907. Serial No. 370,176.

*To all whom it may concern:*

Be it known that I, EDWARD A. JOHNSTON, a citizen of the United States, residing at Sterling, in the county of Whiteside and State of Illinois, have invented a new and useful Improvement in Seed-Dropping Mechanism for Corn-Planters, of which the following is a complete specification.

This invention relates to check-row corn planters, and the object in view is to simplify the construction and secure accuracy in the operation of the seed dropping mechanism.

The novel features will be hereinafter described, pointed out in the appended claims and illustrated in the accompanying drawings, in which—

Figure 1 represents a transverse section through a seed hopper and adjacent coöperating mechanism in which is embodied my invention. Fig. 2 shows a plan of the hopper bottom. Fig. 3 is a plan of the annular shaped seed plate. Fig. 4 is a section taken through one side of the seed plate and underlying bevel gear plate as indicated by the line 4—4 in Fig. 3. Fig. 5 represents a partial elevation and section of the clutch members on the seed shaft. Fig. 6 is a transverse section through the clutch member on the seed shaft designed to show the construction of the clutch mechanism. Fig. 7 is a front elevation of the cam carrying disk on the fixed clutch member; and Fig. 8 is a side elevation of said disk.

As the new features of this invention reside in the seed dropping mechanism and operating members therefor, only the parts necessary to illustrate its application to a corn planter will be shown and described herein.

On the main cross beam 1 of the runner frame, at each end (only one end thereof being shown), is fixed a bracket 2, on which is supported the hopper bottom 3. This hopper bottom is inclined and provided with the central upwardly projecting flat disk-like portion 4, which is surrounded by the annular seed plate 5, the seed plate being guided and held against lateral movement by the projecting portion 4 of the bottom 3. To facilitate the entrance of the kernels of corn to the seed cups or cells, the portion 4 of the bottom is provided with the cutaway portions $4^1$, preferably three in number, at the lowest portion of the hopper.

The seed plate 5 is provided with a series of seed cups or cells 6 on its inner face, and rests upon the flat shoulder portion 7 of the bottom 3. A bevel gear plate 8 underlies the seed plate 5, this plate resting also upon the shoulder or ledge 7 and being operatively connected to the seed plate by means of the dowel pins 9. An extension 10 of the shoulder portion 7 of the bottom is constructed to form an annular channel, in which is housed the bevel gear plate 8. The top of the channel formed by the extension 10 is closed by the flange $11^1$ on the hopper casting 11, the casting being bolted to the bottom by means of the bolts 12. To this casting 11 is secured the wall 13 of the hopper. As the hopper bottom is arranged at an angle of substantially 45° from the horizontal, the hopper wall 13 is accordingly cut on a corresponding angle so that the top thereof will extend horizontally.

In addition to the special features of construction of the bottom 3 already described, it is also provided with a seed opening 14 at its highest point, and also with a centrally arranged pocket 15, which communicates at its upper end with the seed opening 14 and merges below into the hopper bottom 3, near the center thereof. A seed duct 16 also communicates above with the outlet 14 and leads from the hopper to the tube 17, which conducts the seed to the furrow opening device, the latter not being shown. A seed gate 18 is pivotally mounted near the upper end of the pocket 15 for diverting the seed either into the duct 16 or back into the pocket 15. The mechanism for operating this gate will be hereinafter described.

A seed or operating shaft 19 is suitably journaled at its end in the bracket 2, and to the end of this shaft is fixed the bevel pinion 20, which meshes with and imparts movement to the bevel gear plate 8, and through it to the seed plate 5. Intermittent rotation is given to the shaft 19 by means of a clutch mechanism comprising the continuously rotating member 21 sleeved loosely on said shaft and the member 22 fixed to said shaft and adapted to engage said rotating member. The member 21 may be driven from any moving part of the machine preferably and, as is customary, from the main axle. The member 21 consists of a sprocket wheel provided with a laterally projecting flange $21^1$, which has formed on its interior a series of teeth $21^2$. On the member 22 is mounted the spring-held arm 23 carrying the roller $23^1$, which is adapted to engage said teeth $21^2$. A hook or arm 24, mounted on the rock shaft 25, is adapted to engage with its upper end the pawl arm 23, carrying the roller $23^1$, and thereby disengage the clutch members. The spring-held arm or pawl 23 normally operates to hold the roller $23^1$ into engagement with the teeth, and the hook 24 operates normally to hold it out of engagement. The spring 26, interposed between the lower end of the said arm 24 and a fixed point on the frame, tends to force the upper end of said arm into the path of the pawl arm 23 and thus disengage the clutch members. The shaft 25, on which a hook arm 24 is mounted, is rocked by the button (not shown) on the check wire engaging the arm 26, fixed also on the rock shaft 25, and the clutch members are thrown into engagement to actuate the seed dropping mechanism for each hill of corn, as is well understood. The chain 27 engages at its forward end the constantly rotating clutch member 21, and at its rear end may engage a sprocket wheel on the main wheel axle, these last mentioned parts not being shown, as such construction is the one usually employed, and their disclosure would not add clearness to the description of the invention.

Fixed to the shaft 19, and preferably formed integral with the fixed clutch member 22, is a cam carrying disk 28, to which is secured the cam projection 29. This cam projection is made adjustable in length by attaching the additional piece or pieces 29¹, or in any other suitable manner. A lever 30 is pivotally mounted at 31 on the post 32, which is secured to the main cross beam 1. On this lever is mounted the roller 33, arranged to contact the cam projection 29 and thereby cause the lever to vibrate, the spring 34 operating to hold the roller against the cam projection. Rods 35 connect the ends of the lever 30 with the gates 18 in the seed duct, only the gate on one side of the planter being shown, however, for the reason explained.

The operation of the mechanism is as follows: Assuming the hopper to be filled with seed and the hook 24 to have been rocked on its shaft to permit the clutch members to engage, the parts of the clutch will occupy the position shown in Fig. 6. This engagement will cause the seed shaft 19 to rotate one complete revolution, at which time the clutch members will again be disengaged by the hook 24 contacting the pawl arm 23 and the shaft stopped. The single rotation of the shaft 19 will impart movement to the seed plate 5 through the bevel gear pinion 20 and the bevel gear plate 8, the movement being sufficient to cause a number of seed cells 6 to pass over the seed opening 14 which shall not be less than the maximum number of seeds required to be dropped. The rotation of the shaft 19 will also cause the cam disk 28 to rotate, and the position of the cam projection 29 is so timed with respect to the other moving members, and its length is so adjusted that through the lever 30 and the connecting rod 35 the gate 18 will be held up or open, as shown in Fig. 1, long enough to permit the required number of seeds to drop through the seed opening 14 into the seed duct 16. When the said gate occupies the dotted line position of Fig. 1 it closes the duct 16 and the seed drops upon the gate and into the pocket 15, thence back into the hopper. The gate 18 constitutes means for diverting the seed either into the duct or into the pocket, and by adjusting the length of the cam projection 29 the said gate can be made operable for a predetermined length of time. In effect the gate closes the seed outlet 14, but the construction shown permits it to pass through the seed outlet and back into the hopper through the pocket 15. The inclination given to the hopper bottom and walls affords inclined surfaces down which the grains of corn slide and assume a position which will facilitate their ready entrance into the seed cells 6. Furthermore, the inclined bottom enables the seed to drop through the seed opening and be easily returned to the hopper by its own gravity.

What I claim as my invention, and desire to secure by Letters Patent, is:

1. In a seed dropping mechanism for corn planters, in combination, a hopper having an inclined bottom and a seed opening at the highest point therein, a seed plate, a shaft, a driving connection between said shaft and seed plate, a continuously moving driving member, and means for intermittently engaging said driving member and seed shaft.

2. In a seed dropping mechanism for corn planters, in combination, a seed hopper having an inclined bottom and a seed opening at the highest point therein, a seed plate, a bevel gear plate underlying and rotatively fixed to said seed plate, a shaft, a bevel pinion fixed thereon which meshes with and drives said bevel gear plate, a continuously moving driving member, and means for intermittently engaging said driving member and seed shaft.

3. In a seed dropping mechanism for corn planters, in combination, a seed hopper having an inclined bottom, a seed plate mounted in the bottom thereof and provided with a seed outlet at its highest point, a seed duct communicating with said outlet and leading from the hopper, means operable for a variable length of time for shutting off the communication between the seed outlet and the seed duct, and means for rotating said plate.

4. In a seed dropping mechanism for corn planters, in combination, a seed hopper having an inclined bottom, a seed plate mounted in the bottom thereof, a seed opening located at the highest point in said bottom, a seed duct communicating with said seed opening, a pocket formed in the hopper bottom and communicating also with the seed opening, means for diverting the seed either into the seed duct or into the pocket, and means for imparting an intermittent motion to the seed plate.

5. In a seed dropping mechanism for corn planters, in combination, a seed hopper having an inclined bottom, a seed plate mounted in the bottom thereof, a seed opening located at the highest point in said bottom, a seed duct communicating with said seed opening, a pocket formed in the hopper bottom and communicating also with the seed opening, means operable for predetermined and variable lengths of time for diverting the seed either into the seed duct or into the pocket, and means for imparting an intermittent motion to the seed plate.

6. In a seed dropping mechanism for corn planters, in combination, a seed hopper having an inclined bottom, a seed plate mounted in the bottom thereof, a seed opening located at the highest point in said bottom, a seed duct communicating with said seed opening, a pocket formed in the hopper bottom and communicating also with the seed opening, a gate for diverting the seed either into the seed duct or into the pocket, an intermittently rotating shaft having a gear connection with the seed plate, a member secured to said shaft and provided with a cam projection of adjustable length, and an operative connection between said cam projection and the said gate.

7. In a seed dropping mechanism for corn planters, in combination, a seed hopper having an inclined bottom provided at its upper side with a seed opening, a seed plate mounted in said bottom, a duct communicating with said opening, means for closing said duct, an intermittently rotating shaft having a gear connection with the seed plate, and a driving connection between the shaft and duct closing means.

8. In a seed dropping mechanism for corn planters, in combination, a seed hopper having an inclined bottom provided at its upper side with a seed opening, a seed plate mounted in said bottom, a seed duct communicating with said opening, means for closing said duct, an intermittently rotating shaft having a gear connection with the seed plate, a continuously rotating clutch member on said shaft, a coacting clutch member fixed to said shaft, and an operative connection extending between the fixed clutch member and the means for closing the seed duct.

9. In a seed dropping mechanism for corn planters, in combination, a seed hopper having an inclined bottom, the said bottom being provided with a seed opening and a pocket at its upper side and an annular depressed channel formed about its periphery for housing the seed plate and bevel gear plate, a seed plate and bevel gear plate rotatively fixed to each other and mounted in said channel, a seed duct communicating with the seed opening, a gate for diverting the seed either into the pocket or into the duct, a shaft, a continuously rotating member loose on said shaft, a clutch member fixed to the shaft and adapted to be engaged with said rotating clutch member for intermittently actuating the seed dropping mechanism, a cam projection movable with said shaft, a lever in operative relation with said cam, and a rod connecting with said lever and gate for controlling the latter, substantially as and for the purpose specified.

EDWARD A. JOHNSTON.

Witnesses:
GEO. K. BARTON,
LEO J. FORSTER.